(12) United States Patent
Kato (10) Patent No.: US 11,797,237 B2
(45) Date of Patent: Oct. 24, 2023

(54) PRINTER SYSTEM, NON-TRANSITORY COMPUTER-READABLE RECORDING MEDIUM STORING COMPUTER-READABLE INSTRUCTIONS FOR SERVER, SERVER, AND METHOD EXECUTED BY SERVER FOR SHIPPING OF NEW COLOR MATERIAL CARTRIDGE FOR PRINTER

(71) Applicant: BROTHER KOGYO KABUSHIKI KAISHA, Nagoya (JP)

(72) Inventor: Shuhei Kato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/819,079

(22) Filed: Aug. 11, 2022

(65) Prior Publication Data

US 2023/0059456 A1 Feb. 23, 2023

(30) Foreign Application Priority Data

Aug. 20, 2021 (JP) ................. 2021-135084

(51) Int. Cl.
*G06F 3/12* (2006.01)
*G06K 15/00* (2006.01)

(52) U.S. Cl.
CPC .......... *G06F 3/1203* (2013.01); *G06F 3/1229* (2013.01); *G06F 3/1285* (2013.01); *G06K 15/4075* (2013.01)

(58) Field of Classification Search
CPC .... G06F 3/1203; G06F 3/1229; G06F 3/1285; G06K 15/4075

(Continued)

(56) References Cited

U.S. PATENT DOCUMENTS 7,254,563 B1 * 8/2007 Gelfer ................ G07B 17/0008
705/401
2008/0174624 A1 * 7/2008 Sudo .................... B41J 2/17566
347/14

(Continued)

FOREIGN PATENT DOCUMENTS

JP 2016193592 A 11/2016

*Primary Examiner* — Allen H Nguyen
(74) *Attorney, Agent, or Firm* — Scully, Scott, Murphy & Presser, PC (57) ABSTRACT

A printer may include a memory configured to store remaining amount-related information related to a remaining amount of color material in a single-purpose color material cartridge mounted on the printer. The printer may send first printer information to a server in a case where the single-purpose color material cartridge is mounted on the printer, and send second printer information to the server in a case where the general-purpose color material cartridge is mounted on the printer. The server may determine whether, regardless of which of the first printer information and the second printer information has been received from the printer, the remaining amount-related information included in the received first printer information or the received second printer information satisfies a predetermined condition, and execute a shipping process for shipping a new single-purpose color material cartridge in a case where the predetermined condition is satisfied.

10 Claims, 5 Drawing Sheets

(58) Field of Classification Search
USPC ........................................................ 358/1.15
See application file for complete search history.

(56) References Cited

U.S. PATENT DOCUMENTS

2011/0191198 A1\* 8/2011 Rise ................... G06Q 30/0601
705/26.1
2016/0292550 A1 10/2016 Kawai \* cited by examiner

PRINTER SYSTEM, NON-TRANSITORY COMPUTER-READABLE RECORDING MEDIUM STORING COMPUTER-READABLE INSTRUCTIONS FOR SERVER, SERVER, AND METHOD EXECUTED BY SERVER FOR SHIPPING OF NEW COLOR MATERIAL CARTRIDGE FOR PRINTER

REFERENCE TO RELATED APPLICATIONS

This application claims priority from Japanese Patent Application No. 2021-135084 filed on Aug. 20, 2021. The entire content of the priority application is incorporated herein by reference.

BACKGROUND ART

A flat-rate print process is known, with which a print process can be executed on a predetermined number of sheets at a fixed rate every predetermined period. For the flat-rate print process, a single-purpose cartridge is used. When printing is executed using the single-purpose cartridge, a printer sends information related to a remaining amount of ink in the single-purpose cartridge to an information management server. When the remaining amount of ink in the single-purpose cartridge decreases below a threshold, a new single-purpose cartridge is shipped to a user.

DESCRIPTION

The disclosure herein provides a technique for appropriately shipping a single-purpose color material cartridge.

A printer system may include a printer and a server is disclosed herein. The printer may be configured to use both a single-purpose color material cartridge for receiving provision of a service related to printing and a general-purpose color material cartridge different from the single-purpose color material cartridge. The printer may include: a memory configured to store remaining amount-related information related to a remaining amount of color material in the single-purpose color material cartridge mounted on the printer; and a printer controller, the printer controller may be configured to: in a case where the single-purpose color material cartridge is mounted on the printer, send first printer information to the server, wherein the first printer information includes single-purpose information which indicates the single-purpose color material cartridge is mounted on the printer and the remaining amount-related information which has been stored in the memory; and in a case where the general-purpose color material cartridge is mounted on the printer, send second printer information to the server, wherein the second printer information includes general-purpose information which indicates the general-purpose color material cartridge is mounted on the printer and the remaining amount-related information which has been stored in the memory. The server may include a server controller, and the server controller may be configured to: regardless of which of the first printer information including the single-purpose information and the second printer information including the general-purpose information has been received from the printer, determine whether the remaining amount-related information included in the received first printer information or the received second printer information satisfies a predetermined condition; and in a case where the predetermined condition is satisfied, execute a shipping process for shipping a new single-purpose color material cartridge.

According to the configuration above, the server executes the shipping process for shipping a new single-purpose color material cartridge in the case where the predetermined condition is satisfied, regardless of which of the first printer information and the second printer information has been received from the printer. Thus, a new single-purpose color material cartridge can be shipped according to the shipping process by the server in the case where the predetermined condition is satisfied, regardless of which of the single-purpose color material cartridge and the general-purpose color material cartridge is mounted on the printer.

The printer as mentioned above, a computer-readable instructions for the printer, a non-transitory computer-readable recording medium storing the computer-readable instructions for the printer, and a method executed by the printer are also novel and useful. The server as mentioned above, a computer-readable instructions for the server, a non-transitory computer-readable recording medium storing the computer-readable instructions for the server, and a method executed by the server are also novel and useful.

Figure 1:
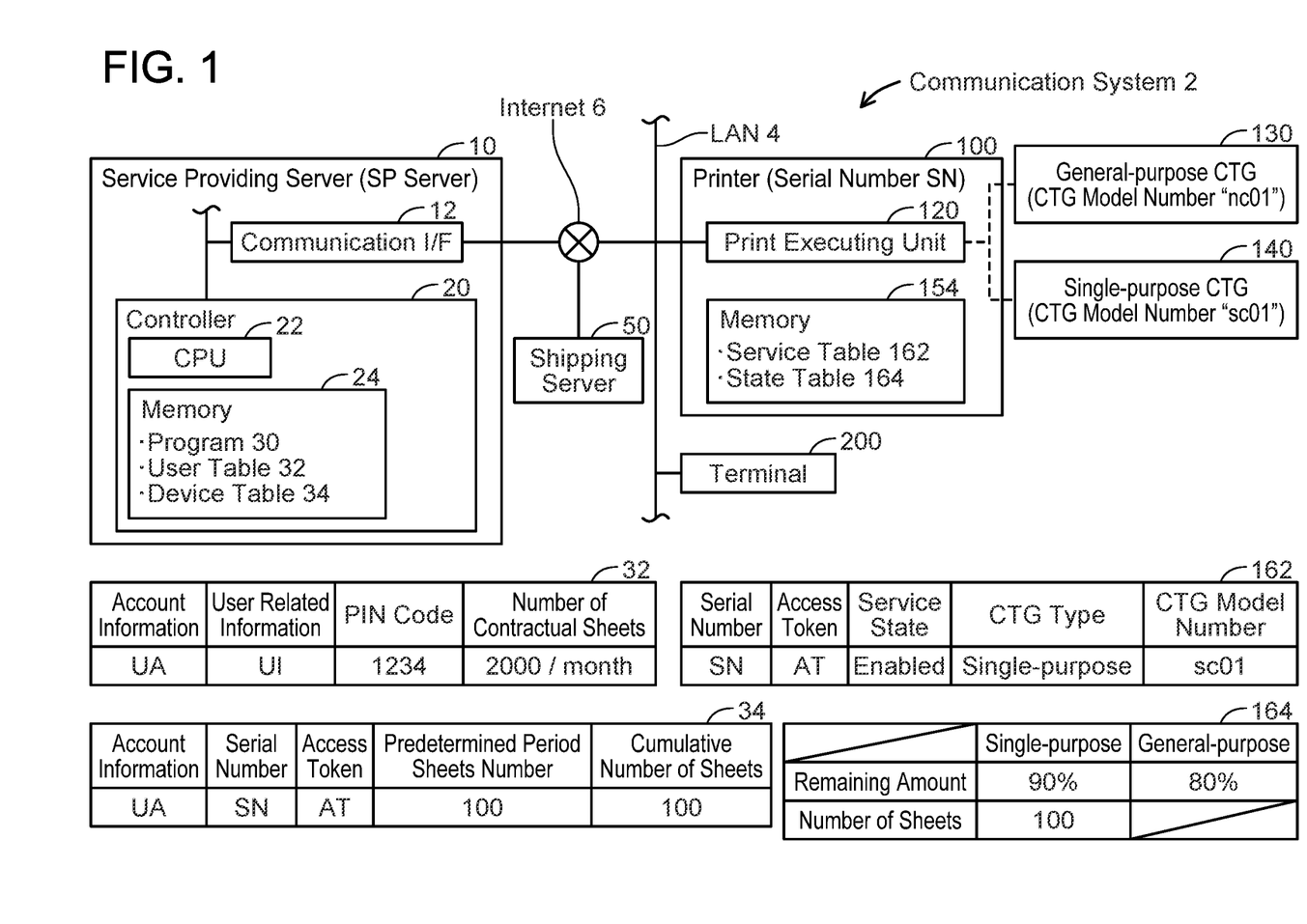
FIG. 1 illustrates a configuration of a communication system.

CONFIGURATION OF COMMUNICATION SYSTEM 2; FIG. 1

As illustrated in FIG. 1, a communication system 2 comprises a service providing server 10 (abbreviated as "SP server 10" hereinafter), a shipping server 50, a printer 100, and a terminal 200. The printer 100 and the terminal 200 are connected to a local area network (LAN) 4 and communicable with each other via the LAN 4. The LAN 4 may be a wired LAN or a wireless LAN. The SP server 10 and the LAN 4 are connected to Internet 6. The SP server 10 is communicable with the devices 100 and 200 via the Internet 6 and the LAN 4. The SP server 10 is also communicable with the shipping server 50 via the Internet 6. The terminal 200 is a terminal such as a desktop PC, a tablet PC, a smartphone, or the like.

CONFIGURATION OF SP SERVER 10

The SP server 10 provides a printing-related service. This service includes a flat-rate printing service and a shipping service of shipping a color material cartridge that can be mounted on a printer (e.g., the printer 100). Hereinafter, cartridge will be abbreviated as "CTG".

The flat-rate printing service allows for printing on a preset contractual number of sheets (e.g., 2000 sheets) of print medium at a fixed rate every predetermined period (e.g., every month). A user does not need to pay extra fees until the number of sheets of print medium on which printing was executed within the predetermined period (which will be termed "predetermined period sheets number") reaches the contractual number of sheets of print medium. When the predetermined period sheets number exceeds the contractual number of sheets, the user needs to pay extra fees (e.g., fees calculated by multiplying the exceeded number of sheets by a unit price). The contractual number of sheets is determined by the user, for example, upon signing the contract for the printing service.

The shipping service is a service of shipping a new single-purpose CTG to the user when a remaining amount in a single-purpose CTG (which will be described later) mounted on a printer has become low. The SP server 10 sends the shipping server 50 a shipping request that requests shipping of a single-purpose CTG to provide the shipping service. In response to this, the shipping server 50 executes a process for shipping a single-purpose CTG (e.g., notification to shipping staff).

The SP server 10 is installed on the Internet 6 by the vendor of the printer 100. In a modification, the SP server 10 may be installed on the Internet 6 by a business entity different from the vendor. In another modification, the vendor of the printer 100 may use an environment provided by an external cloud computing service, without preparing hardware of the SP server 10 on its own. In this case, the vendor of the printer 100 may prepare a program (i.e., software) for the SP server 10 and introduce it to the environment above to implement the SP server 10.

The SP server 10 comprises a communication interface 12 and a controller 20. The units 12, 20 are connected to a bus line (reference sign omitted). Hereinafter, interface will be denoted simply as "I/F". The communication I/F 12 is connected to the Internet 6.

The controller 20 comprises a CPU 22 and a memory 24. The CPU 22 executes various processes in accordance with a program 30 stored in the memory 24. The memory 24 is configured of a volatile memory, a non-volatile memory, etc. The memory 24 further stores a user table 32 and a device table 34.

The user table 32 stores one or more pieces of user information corresponding to one or more users who receive provision of the printing service. Each user information includes account information (e.g., UA) of the user and user-related information (e.g., UI) related to the user. The account information includes, for example, a user name and a password. The user-related information includes, for example, shipping destination information indicating an address to which a single-purpose CTG is shipped, an e-mail address of the user, and a credit card number of the user. The user table 32 further stores a personal identification number (PIN) code (e.g., "1234") and a contractual number of sheets (e.g., "2000") in association with each account information. The PIN code is information used in authentication for registering the serial number of a printer in the device table 34.

The device table 34 stores one or more pieces of device information. The device table 34 stores account information (e.g., UA), the serial number of a printer (e.g., SN), an access token (e.g., AT), the predetermined period sheets number (e.g., "100"), and the cumulative number of sheets (e.g., "100") in association with each other. The access token is authentication information used in communication between a printer and the SP server 10. The predetermined period sheets number indicates the number of sheets of print medium on which printing is executed at the printer within a predetermined period (e.g., one month). The cumulative number of sheets indicates the number of sheets of print medium on which printing was executed at the printer in the past.

CONFIGURATION OF PRINTER 100

The printer 100 is a peripheral device (e.g., a peripheral device of the terminal 200) configured to execute a print function. In a modification, the printer 100 may be a multifunctional device configured to execute a scan function, a FAX function, etc. in addition to the print function. A serial number SN for identifying the printer 100 is assigned to the printer 100.

The printer 100 comprises a print executing unit 120 and a memory 154. The print executing unit 120 comprises a print mechanism of inkjet scheme or laser scheme. A color material CTG containing a color material, such as ink, toner, or the like, is mounted to the print executing unit 120. The color material CTG includes an IC chip (not illustrated), and the print executing unit 120 comprises a reader (not illustrated) configured to read the IC chip.

One of various types of CTGs including the single-purpose CTG and general-purpose CTG can be mounted to the print executing unit 120. The general-purpose CTG is generally distributed CTG the user can purchase at appliance retailers, online, etc. The single-purpose CTG is for receiving provision of the printing service described above and is sent to the user from the shipping server 50 on condition that the user signs the contract of the printing service.

The printer 100 can also use a starter CTG (not illustrated) for printing, which is different from the general-purpose CTG and the single-purpose CTG. The starter CTG is included in the package of the printer 100 (i.e., an accessory of the printer 100) upon purchasing the printer 100.

The IC chip of a general-purpose CTG 130 which is to be actually used by the user of the printer 100 stores a CTG model number "nc01" for identifying the general-purpose CTG 130. The IC chip of a single-purpose CTG 140 which is to be actually used by the user of the printer 100 stores a CTG model number "sc01" for identifying the single-purpose CTG 140.

In the present embodiment, the printer 100 is capable of using any one of the general-purpose CTG, the single-purpose CTG, and the starter CTG for printing. When the printer 100 is in a service enabled state in which the printer 100 is capable of receiving provision of the service (i.e., the printing service and the shipping service), the printer 100 can use the color material in the general-purpose CTG for printing or use the color material in the single-purpose CTG for printing. On the other hand, when the printer 100 is in a service disabled state in which the printer 100 is incapable of receiving provision of the service, the printer 100 can use the color material of the general-purpose CTG for printing but cannot use the color material of the single-purpose CTG for printing.

The starter CTG serves as follows. When the printer 100 is in the service enabled state, the starter CTG is used as the single-purpose CTG. On the other hand, when the printer 100 is in the service disabled state, the starter CTG is used as the general-purpose CTG. Thus, the starter CTG is used as the general-purpose CTG or the single-purpose CTG depending on the service state of the printer 100. In the following description, details as to a case in which the starter CTG is mounted on the printer 100 will be omitted.

The memory 154 stores a service table 162 and a state table 164. The memory 154 is configured of a volatile memory, a non-volatile memory, etc.

The service table 162 stores information related to the service. The service table 162 stores the serial number SN of the printer 100, an access token (e.g., AT), a service state (e.g., "enabled"), a CTG type (e.g., "single-purpose"), and a CTG model number (e.g., "sc01") in association with each other. The service state indicates one of "Enabled" meaning that the printer 100 is in the service enabled state and "Disabled" meaning that the printer 100 is in the service disabled state. The CTG type is information indicating the type of CTG that is currently mounted on the printer 100. That is, in the present embodiment, the CTG type indicates one of the single-purpose CTG, the general-purpose CTG, and the starter CTG. The CTG model number indicates the model number read from the IC chip of a color material CTG currently mounted on the printer 100. The CTG type is identified based on the CTG model number read from the IC chip. For example, the CTG type "general-purpose" is identified based on a character string "nc" in the CTG model number "nc01" stored in the IC chip of the general-purpose CTG 130. Further, for example, the CTG type "single-purpose" is identified based on a character string "sc" in the CTG model number "sc01" stored in the IC chip of the single-purpose CTG 140.

The state table 164 stores remaining amount and the number of sheets. The remaining amount indicates the latest remaining amount of color material in a color material CTG mounted on the printer 100. The remaining amount is stored for each of the single-purpose CTG and the general-purpose CTG. It should be noted that the remaining amount is not information that indicates only the remaining amount of color material in the color material CTG currently mounted on the printer 100. For example, a situation can be assumed where the single-purpose CTG 140 is mounted to the printer 100 first and then the general-purpose CTG 130 is mounted thereto next as a replacement of the single-purpose CTG 140. In this case, the remaining amount of color material in the single-purpose CTG 140 which was mounted on the printer 100 until a while ago (90% in the example of FIG. 1) is stored in a region for the remaining amount of the single-purpose CTG. Further, the remaining amount of color material in the general-purpose CTG 130 which is currently mounted on the printer 100 (80% in the example of FIG. 1) is also stored in a region for the remaining amount of the general-purpose CTG. Hereinafter, the region for the remaining amount in the general-purpose CTG and the region for the remaining amount in the single-purpose CTG will be termed "general-purpose remaining amount region" and "single-purpose remaining amount region", respectively. The number of sheets indicates a cumulative number of sheets of print medium on which the printer 100 executed printing by using the color material in the single-purpose CTG. The cumulative number of sheets of print medium on which the printer 100 executed printing by using the color material in the general-purpose CTG is not stored.

SPECIFIC CASE; FIGS. 2 TO 5

Referring to FIGS. 2 to 5, processes executed by the communication system 2 will be described. First, referring to FIG. 2, a registration process for registering information in the device table 34 will be described. Hereinafter, for easier understanding, steps executed by CPUs of respective devices (e.g., the CPU 22 of the SP server 10) will be described with the devices (e.g., the SP server 10) as the subjects of action instead of with the CPUs as the subjects of action. Further, communication between the SP server 10 and the shipping server 50 is executed via the communication I/F 12 and the Internet 6, and communication between the SP server 10, the printer 100, and the terminal 200 is executed via the communication I/F 12, LAN 4 and the Internet 6, and thus hereinafter phrases "via the communication I/F 12", "via the Internet 6", and "via the LAN 4" will be omitted when communication between the devices is described.

Figure 2:
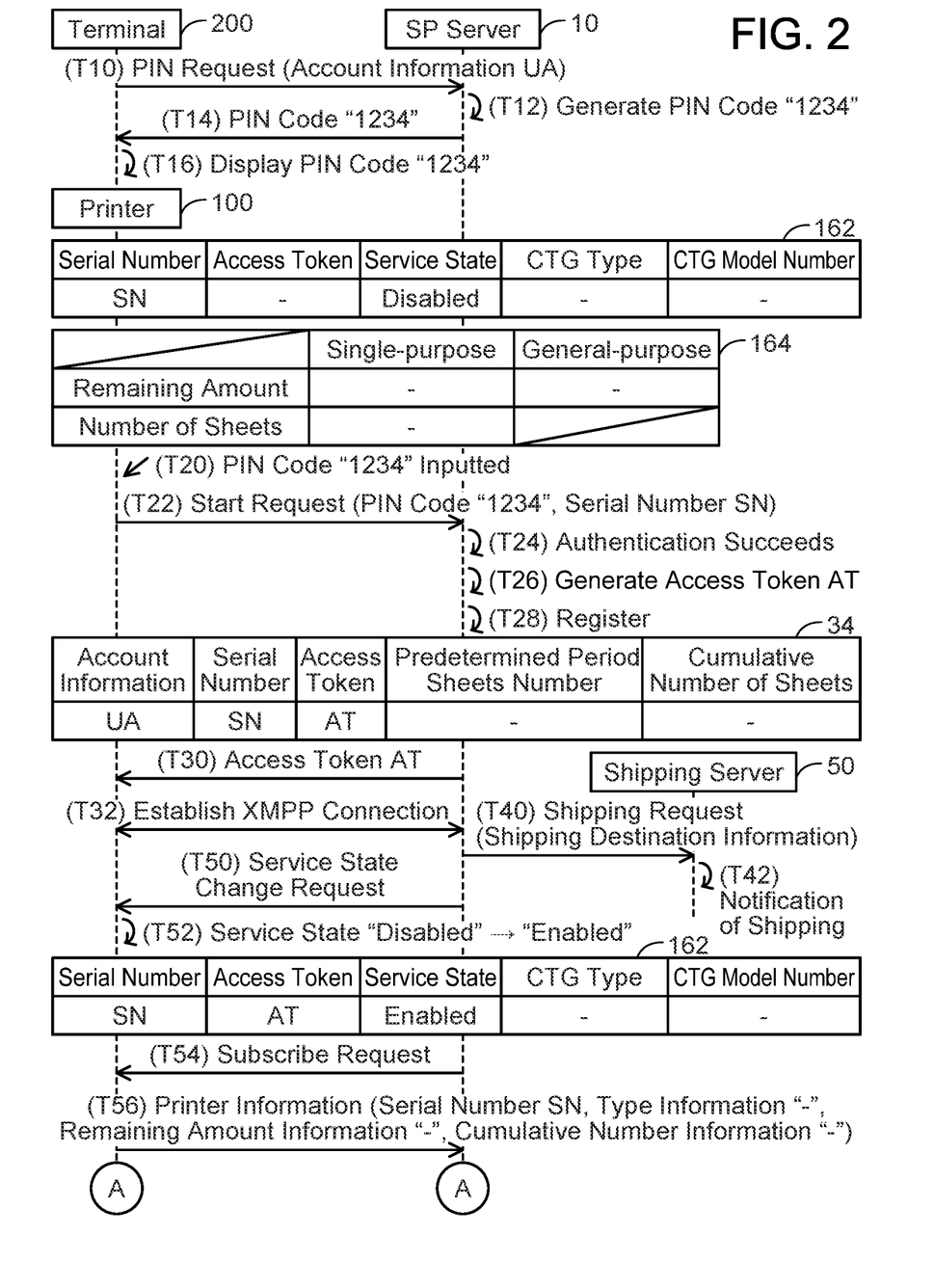
FIG. 2 illustrates a sequence diagram of a process executed in the communication system.

In an initial state of FIG. 2, account information UA and user-related information UI are already registered in the user table 32 (see FIG. 1). The account information UA and the user-related information UI are registered in the SP server 10, for example, by the user operating the terminal 200. Further, in the initial state of FIG. 2, a color material CTG has never been mounted to the printer 100 and the service state of the printer 100 is the service disabled state. Thus, in the initial state, the access token, the CTG type, and the CTG model number are blank and the service state indicates "Disabled" in the service table 162. Similarly, the respective items in the state table 164 are also blank.

When the terminal 200 accepts, from the user, an operation of designating a Uniform Resource Locator (URL) of the SP server 10 and an operation of inputting the account information UA, the terminal 200 sends a PIN request to the SP server 10 in T10. The PIN request includes the inputted account information UA.

When receiving the PIN request from the terminal 200 in T10, the SP server 10 generates a PIN code "1234" in T12 and stores the generated PIN code "1234" in the user table 32 in association with the account information UA included in the PIN request (see FIG. 1). The SP server 10 then sends the generated PIN code "1234" to the terminal 200 in T14.

When receiving the PIN code "1234" from the SP server 10 in T14, the terminal 200 displays the PIN code "1234" in T16. The user is thereby able to know the PIN code "1234".

When the printer 100 accepts input of the PIN code "1234" from the user in T20, the printer 100 sends a start request to the SP server 10 in T22. The start request includes the inputted PIN code "1234" and the serial number SN of the printer 100. The start request is a signal that requests the SP server 10 to start the printing service described above.

When receiving the start request from the printer 100 in T22, the SP server 10 executes authentication for the PIN code "1234" included in the start request in T24. In the present case, the SP server 10 determines in T24 that the authentication for the PIN code succeeds since the PIN code "1234" included in the start request matches the PIN code "1234" stored in the user table 32. In this case, the SP server 10 determines the account information UA, which is stored in association with the PIN code "1234" in the user table 32, as account information to be registered. Then, the SP server 10 generates an access token AT in T26, and registers the account information UA to be registered, the serial number SN included in the start request, and the generated access token AT in association with each other in the device table 34 in T28. At this point, specific values for the predetermined period sheets number and the cumulative number of sheets have not been stored yet in the device table 34 in association with the registered account information UA.

The SP server 10 sends the generated access token AT to the printer 100 in T30. The printer 100 stores the received access token AT in the service table 162. At this point, the service state indicates "Disabled" and the CTG type and the CTG model number are blank in the service table 162.

The printer 100 establishes an Extensible Messaging and Presence Protocol (XMPP) connection with the SP server 10 in T32 by using the access token AT stored in the service table 162. The XMPP connection is a so-called continuous connection. By using the XMPP connection, the SP server 10 can send requests to the printer 100 beyond the firewall of the LAN 4 to which the printer 100 belong, without receiving requests from the printer 100. That is, the XMPP connection allows for server-push communication. The SP server 10 may send requests to the printer 100 not by the XMPP connection but by another means. For example, a Hypertext Transfer Protocol Secure (HTTPS) connection may be established between the printer 100 and the SP server 10.

The SP server 10 specifies in the user table 32 shipping destination information of the user-related information UI associated with the registered account information UA (see T24). The SP server 10 then sends a shipping request including the specified shipping destination information to the shipping server 50 in T40.

When receiving the shipping request from the SP server 10 in T40, the shipping server 50 notifies shipping staff in T42 that a single-purpose CTG is to be shipped to a shipping destination indicated by the shipping destination information in the received shipping request. As a result, a single-purpose CTG is shipped to the user of the printer 100.

When the XMPP connection with the printer 100 is established in T32, the SP server 10 also sends a service state change request to the printer 100 in T50 by using the established XMPP connection. The service state change request is a signal that requests to change the service state of the printer 100 from the service disabled state to the service enabled state.

When receiving the service state change request from the SP server 10 in T50, the printer 100 changes the service state from the service disabled state to the service enabled state in T52. Thus, the service state of the printer 100 is changed to the state in which the printer 100 is capable of receiving provision of the service, i.e., the state in which the printer 100 can execute printing by using the color material in the single-purpose CTG 140. In this case, the printer 100 changes the service state in the service table 162 from "Disabled" to "Enabled".

When the XMPP connection with the printer 100 is established in T32, the SP server 10 also sends a Subscribe request to the printer 100 in T54 by using the established XMPP connection. The Subscribe request is a signal that requests sending of printer information which indicates the current state of the printer 100 to the SP server 10 on a periodic basis. The Subscribe request includes period information that indicates a period (e.g., 12 hours) with which the printer 100 is to send printer information.

When receiving the Subscribe request from the SP server 10 in T54, the printer 100 starts sending printer information to the SP server 10 in T56 with the period indicated by the period information in the Subscribe request. The printer information includes the serial number SN of the printer 100, type information indicating the CTG type stored in the service table 162, remaining amount information stored in the single-purpose remaining amount region in the state table 164, cumulative number information indicating the number of sheets stored in the state table 164 (i.e., the cumulative number of sheets of print medium on which printing was executed using the color material in the single-purpose CTG 140). Since a color material CTG has never been mounted to the printer 100 yet at this point, the CTG type is not stored in the service table 162 yet. Thus, the printer information sent in T56 includes type information indicating blank. Further, at this point, the state table 164 has not stored any information yet. Thus, the printer information sent in T56 includes remaining amount information indicating blank and cumulative number information indicating blank.

Figure 3:
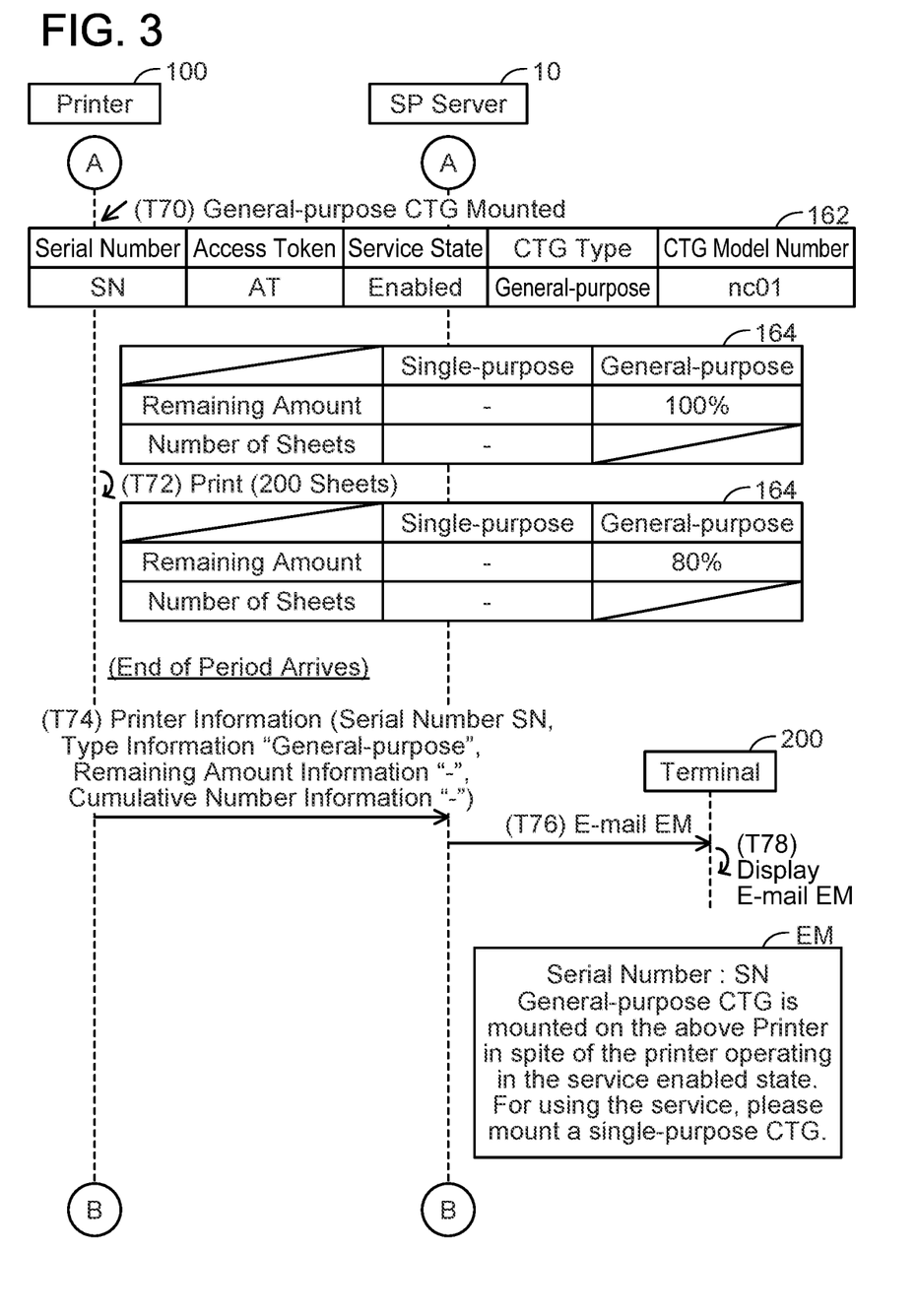
FIG. 3 illustrates a sequence diagram continued from FIG. 2.

CONTINUATION FROM FIG. 2; FIG. 3

Next, a situation where printing is executed at the printer 100 following the process of FIG. 2 will be described. The user of the printer 100 mounts the general-purpose CTG 130 to the print executing unit 120 in T70 of FIG. 3. The printer 100 reads the CTG model number "nc01" from the IC chip of the general-purpose CTG 130. The printer 100 then stores the CTG type "general-purpose" and the CTG model number "nc01" in the service table 162. The printer 100 further detects the remaining amount of color material in the general-purpose CTG 130. Specifically, the printer 100 detects the remaining amount of color material in a color material CTG mounted on the printer 100 by an optical sensor or the like. In a modification, the printer 100 may calculate a used amount of color material by a dot counter each time the printer 100 executes printing and calculate the remaining amount of color material in the color material CTG using the calculated used amount of color material, instead of detecting the remaining amount of color material in the color material CTG by an optical sensor or the like. In another modification, the printer 100 may detect the remaining amount of color material in a color material CTG by a combination of the method of using an optical sensor or the like to detect the remaining amount of color material in the color material CTG and the method of calculating the remaining amount of color material by a dot counter. The printer 100 stores the detected remaining amount ("100%" in the present case) in either of the general-purpose remaining amount region or the single-purpose remaining amount region in the state table 164 depending on the type of the color material CTG. Since the general-purpose CTG 130 is mounted on the printer 100 in the present case, the printer 100 stores the detected remaining amount "100%" in the general-purpose remaining amount region in the state table 164. In a modification, the IC chip of the general-purpose CTG 130 may include information that indicates whether the general-purpose CTG 130 is new or not. When information indicating that the general-purpose CTG 130 is new is read from the IC chip of the general-purpose CTG 130, the printer 100 may store the detected remaining amount "100%" in the general-purpose remaining amount region without detecting the remaining amount of color material in the general-purpose CTG 130.

In T72, the printer 100 executes printing by using the color material in the general-purpose CTG 130. The printing is executed on 200 sheets of print medium in T72 and the color material in the general-purpose CTG 130 is thereby used by 20% (i.e., the remaining amount of color material in the general-purpose CTG 130 becomes 80%). In this case, the printer 100 detects the remaining amount of color material in the general-purpose CTG 130 (i.e., "80%" in the present case) and writes (i.e., stores) the detected remaining amount "80%" in the general-purpose remaining amount region in the state table 164.

Thereafter, the end of the period, which is indicated by the period information included in the Subscribe request received in T54 of FIG. 2, arrives. Thus, the printer 100 sends printer information to the SP server 10 in T74. The printer information sent in T74 is the same as the printer information sent in T56 of FIG. 2, except that the former includes type information "general-purpose". That is, the printer information sent in T74 does not include remaining amount information indicating the remaining amount "80%" stored in the general-purpose remaining amount region in T72 but includes remaining amount information indicating blank.

When receiving the printer information from the printer 100 in T74, the SP server 10 executes the followings. First, the SP server 10 specifies the type information included in the printer information. Since the type information indicates "general-purpose" in the present case, the SP server 10 determines that the general-purpose CTG 130 is mounted on the printer 100 identified by the serial number SN in the printer information. In this case, the SP server 10 sends an e-mail EM in T76. Specifically, the SP server 10 first specifies, in the device table 34, the account information UA associated with the serial number SN in the printer information and specifies, in the user table 32, the user-related information UI associated with the specified account information UA. Then, the SP server 10 specifies the e-mail address included in the specified user-related information UI. The SP server 10 then sends the e-mail EM to the specified e-mail address.

When receiving the e-mail EM from the SP server 10 in T76, the terminal 200 displays the e-mail EM in T78. The e-mail EM includes the serial number SN of the printer 100 and two messages. One of the two messages informs that the general-purpose CTG 130 is mounted on the printer 100 in spite of the printer 100 operating in the service enabled state. The other message prompts the user to mount the single-purpose CTG 140 to the printer 100 instead of the general-purpose CTG 130. By reading the e-mail EM, the user is able to know that the general-purpose CTG 130 is mounted on the printer 100 in spite of the printer 100 being in the service enabled state, that is, that the printer 100 cannot receive provision of the printing service. Further, by reading the e-mail EM, the user is able to know that the single-purpose CTG 140 needs to be mounted to the printer 100 instead of the general-purpose CTG 130 in order to receive provision of the printing service.

The SP server 10 then specifies the cumulative number information included in the printer information received in T74. Since the cumulative number information indicates blank in the present case, the SP server 10 does not update the device table 34. Then, the SP server 10 specifies the remaining amount information included in the printer information. Since the remaining amount information indicates blank in the present case, the SP server 10 does not determine whether a new single-purpose CTG is to be shipped or not.

Figure 4:
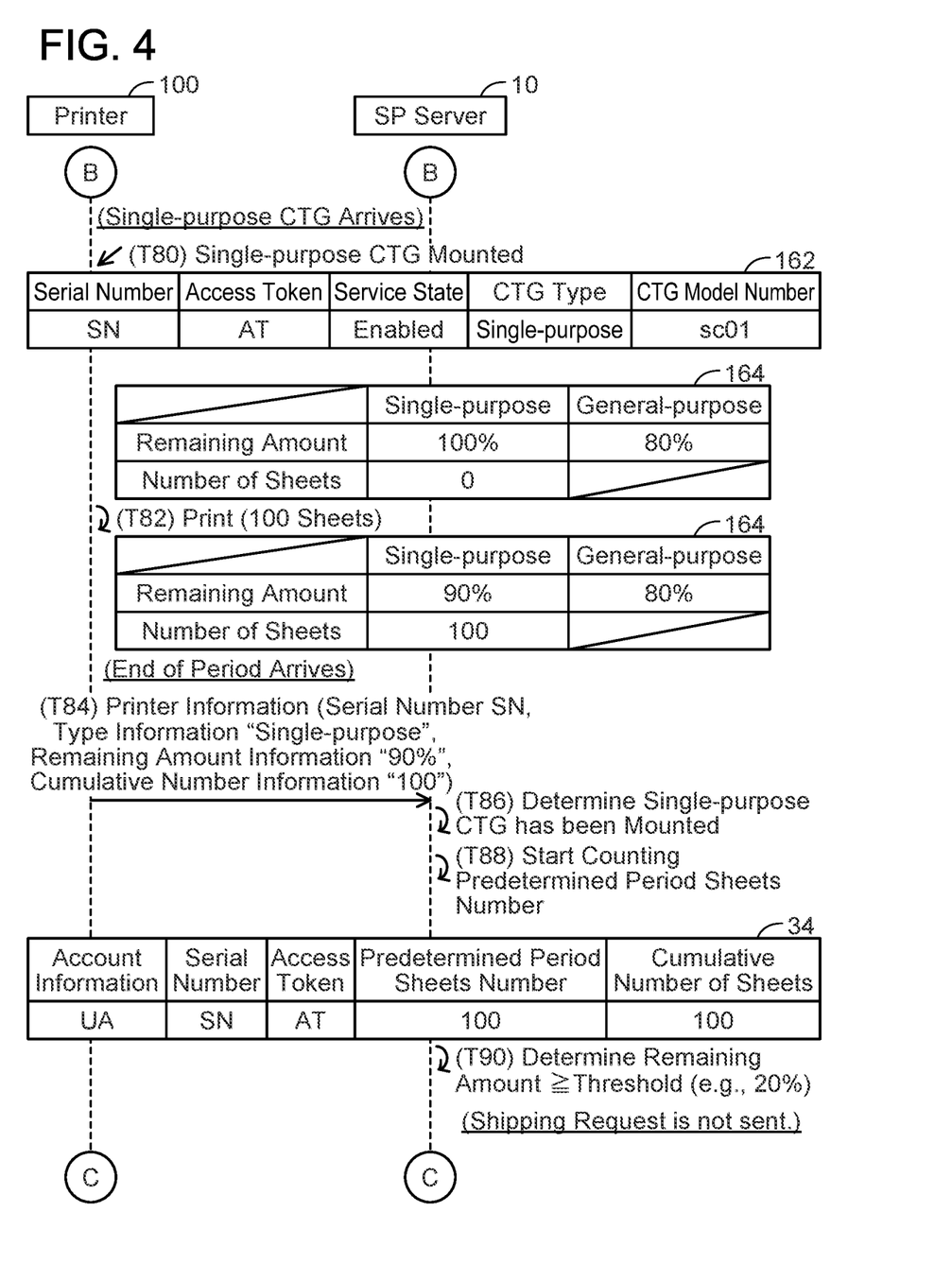
FIG. 4 illustrates a sequence diagram continued from FIG. 3.

CONTINUATION FROM FIG. 3; FIG. 4

Thereafter, the single-purpose CTG 140 shipped according to the process executed by the shipping server 50 (see T40 and T42 in FIG. 2) is delivered to the user. In T80 of FIG. 4, the user mounts the single-purpose CTG 140 to the print executing unit 120 instead of the general-purpose CTG 130. The printer 100 reads the CTG model number "sc01" from the IC chip of the single-purpose CTG 140. The printer 100 then writes (i.e., stores) the CTG type "single-purpose" and the CTG model number "sc01" in the service table 162. Further, the printer 100 detects the remaining amount of color material in the single-purpose CTG 140 and stores the detected remaining amount ("100%" in the present case) in the single-purpose remaining amount region in the state table 164. In a modification, the IC chip of the single-purpose CTG 140 may include information that indicates whether the single-purpose CTG 140 is new or not. When information indicating that the single-purpose CTG 140 is new is read from the IC chip of the single-purpose CTG 140, the printer 100 may store the remaining amount "100%" in the single-purpose remaining amount region without detecting the remaining amount of color material in the single-purpose CTG 140. The printer 100 further stores "0" in a region for the number of sheets in the state table 164.

In T82, the printer 100 executes printing by using the color material in the single-purpose CTG 140. The printing is executed on 100 sheets of print medium in T82 and the color material in the single-purpose CTG 140 is thereby used by 10% (i.e., the remaining amount of color material in the single-purpose CTG 140 becomes 90%). The printer 100 detects the remaining amount of color material in the single-purpose CTG 140 (i.e., "90%" in the present case) and writes (i.e., stores) the detected remaining amount "90%" in the single-purpose remaining amount region in the state table 164. Further, the printer 100 changes the number of sheets in the state table 164 from "0" to "100".

Thereafter, the end of the period indicated by the period information arrives after the latest printer information was sent to the SP server 10 (see T74). Thus, the printer 100 sends printer information to the SP server 10 in T84. The printer information sent in T84 includes the serial number "SN", type information "single-purpose", remaining amount information "90%", and cumulative number information "100".

When receiving the printer information from the printer 100 in T84, the SP server 10 executes the followings. First, the SP server 10 specifies the type information included in the printer information. Since the type information indicates "single-purpose" in the present case, the SP server 10 determines in T86 that the single-purpose CTG 140 is mounted on the printer 100 identified by the serial number SN in the printer information.

Especially in the present case, the SP server 10 determines that the single-purpose CTG 140 is mounted on the printer 100 for the first time after sending the Subscribe request to the server 100 in T54 of FIG. 2. In this case, the SP server 10 starts counting for the predetermined period sheets number in T88. Specifically, the SP server 10 stores the cumulative number information "100" included in the printer information received in T84 in the device table 34 as the predetermined period sheets number in T88. Further, in T88, the SP server 10 stores the cumulative number information "100" included in the printer information received in T84 in the device table 34 as the cumulative number of sheets. Each time the SP server 10 receives printer information from the printer 100, it updates the predetermined period sheets number and the cumulative number of sheets in the device table 34. Specifically, the SP server 10 calculates a difference between the cumulative number information included in the latest printer information and the cumulative number information included in the immediately previous printer information (i.e., the cumulative number of sheets already stored) and adds the difference to the predetermined period sheets number already stored. Further, the SP server 10 writes (i.e., stores) the cumulative number information included in the latest printer information as the cumulative number of sheets. The predetermined period sheets number is reset to "0" on the last day of each month. In a modification, the predetermined period sheets number may be reset to "0" when a predetermined period (e.g., one month) has passed from the day when the counting for the predetermined period sheets number started (see T88).

In T90, the SP server 10 specifies the remaining amount information included in the printer information. In the present case, the remaining amount information indicates a remaining amount of "90%" and the SP server 10 determines that the remaining amount is equal to or greater than a threshold (e.g., 20%). In this case, the SP server 10 does not send the shipping server 50 the shipping request for shipping a new single-purpose CTG to the user of the printer 100.

Figure 5:
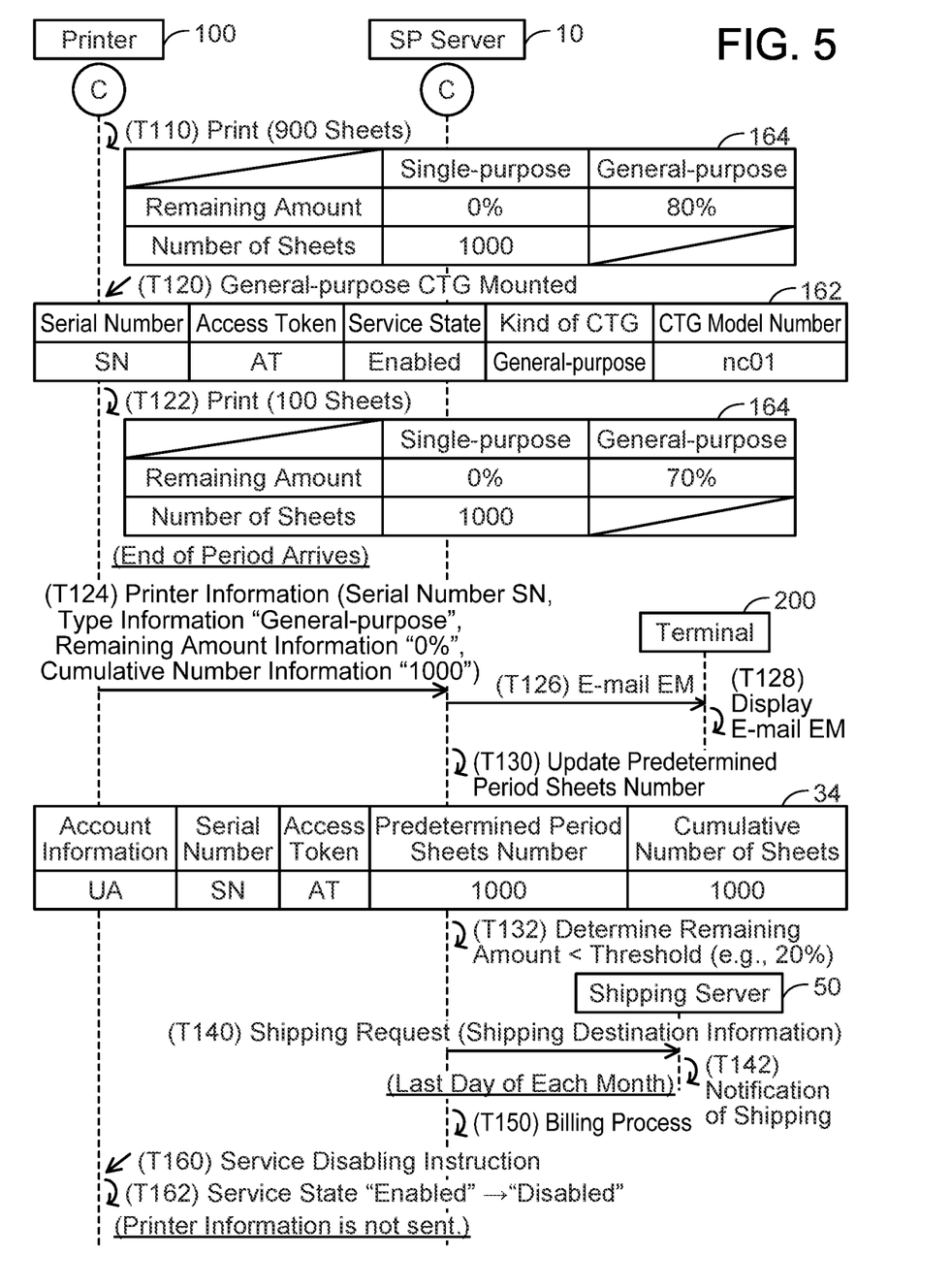
FIG. 5 illustrates a sequence diagram continued from FIG. 4.

CONTINUATION FROM FIG. 4; FIG. 5

T110 in FIG. 5 is the same as T82 in FIG. 4 except that the printing is executed on 900 sheets of print medium and a different value is stored in the state table 164.

The color material in the single-purpose CTG 140 mounted on the printer 100 runs out in T110, and thus the user of the printer 100 mounts the general-purpose CTG 130 to the printer 100 in T120 instead of the single-purpose CTG 140. The general-purpose CTG 130 mounted here is the general-purpose CTG 130 mounted to the printer 100 in T70 of FIG. 3 (i.e., the general-purpose CTG 130 removed in T80 of FIG. 4). T122 is the same as T72 in FIG. 3 except that the printing is executed on 100 sheets of print medium and a different value is stored in the state table 164.

Thereafter, the end of the period indicated by the period information arrives after the latest printer information was sent to the SP server 10 (see T84 in FIG. 4). Thus, the printer 100 sends printer information to the SP server 10 in T124. The printer information sent in T124 includes the serial number SN, type information "general-purpose", remaining amount information "0%", and cumulative number information "1000".

T126 and T128 are the same as T76 and T78 in FIG. 3. The SP server 10 then updates the predetermined period sheets number and the cumulative number of sheets in T130. Specifically, the SP server 10 first calculates a difference "900" between the cumulative number information "1000" included in the latest printer information (see T124) and the cumulative number information "100" included in the immediately previous printer information (see T84 in FIG. 3) (i.e., the cumulative number of sheets already stored). The SP server 10 then adds the difference "900" to the predetermined period sheets number already stored "100" (see T88 in FIG. 3) and stores the predetermined period sheets number "1000" in the device table 34. The SP server 10 further stores the cumulative number information "1000" included in the latest printer information in the device table 34 as the cumulative number of sheets.

In T132, the SP server 10 specifies the remaining amount information included in the printer information. Since the remaining amount information indicates a remaining amount of "0%" in the present case, the SP server 10 determines that the remaining amount is less than the threshold (e.g., 20%). In this case, the SP server 10 sends the shipping request to the shipping server 50 in T140. T140 and T142 are the same as T40 and T42 in FIG. 2. As above, a new single-purpose CTG can be shipped to the user of the printer 100 according to the process of the shipping server 50 when the remaining amount of color material in the single-purpose CTG 140 becomes relatively small.

The SP server 10 may manage a value of the cumulative number of exchanges of the single-purpose CTG at the printer 100 based on printer information received from the printer 100, although this is not illustrated. For example, when the remaining amount information included in the latest printer information indicates an increase from the remaining amount information included in the immediately previous printer information, the SP server 10 may determine that the single-purpose CTG has been exchanged with a new one at the printer 100 and increment the value of the number of exchanges. In a situation where the SP server 10 receives new printer information after a new single-purpose CTG was shipped and the remaining amount indicated by the remaining amount information included in this new printer information is less than the threshold, a new single-purpose CTG may not be shipped so long as the number of exchanges already stored is the same as the number of exchanges at the time when a single-purpose CTG was shipped previously. This is because in such a situation, it is highly probable that the remaining amount information included in the newly received printer information indicates the remaining amount of color material in the single-purpose CTG that was used to previously determine that a single-purpose CTG is to be shipped. Thus, it is possible to prevent occurrence of an event that a new single-purpose CTG is shipped twice or more times based on the remaining amount of color material in the same single-purpose CTG.

When the last day of the month arrives, the SP server 10 executes a billing process based on the predetermined period sheets number in the device table 34 in T150, using the credit card number in the user-related information UI. Since the predetermined period sheets number "1000" does not exceed the contractual number of sheets "2000" (see FIG. 1) in the present case, the SP server 10 charges the user the fixed fee. If the predetermined period sheets number exceeds the contractual number of sheets, the SP server 10 charges the user the fixed fee and an additional fee for the exceeded number of sheets beyond the contractual number of sheets. In a modification, the SP server 10 may execute the process of T150 when a predetermined period (e.g., one month) has passed since the counting for the predetermined period sheets number started (i.e., since T88 in FIG. 4 was executed). When the billing process of T150 is executed, the predetermined period sheets number is reset to "0" in the device table 34, although this is not illustrated.

When the printer 100 accepts a service disabling instruction from the user in T160, it changes its service state from the service enabled state to the service disabled state in T162. Thus, the printer 100 changes the service state in the service table 162 from "Enabled" to "Disabled". Once changed to the service disabled state, the printer 100 does not send printer information to the SP server 10 even when the end of the period indicated by the period information arrives.

Effects of Present Embodiment

According to the configuration above, in the case where the single-purpose CTG 140 is mounted, the printer 100 sends the SP server 10 the printer information that includes the type information "single-purpose" and the remaining amount information indicating the remaining amount "90%" of the color material in the single-purpose CTG 140 (T84 in FIG. 4). Further, in the case where the general-purpose CTG 130 is mounted, the printer 100 sends the SP server 10 the printer information that includes the type information "general-purpose" and the remaining amount information indicating the remaining amount "0%" of the color material in the single-purpose CTG 140 (T124 in FIG. 5). Regardless of which of the printer information including the type information "single-purpose" or the printer information including the type information "general-purpose" has been received from the printer 100, the SP server 10 executes a shipping process for shipping a new single-purpose CTG (T140 and T142 in FIG. 5) in the case where the remaining amount included in the printer information, i.e., the remaining amount of the color material in the single-purpose CTG 140 is less than the threshold (T132 in FIG. 5). Thus, a new single-purpose CTG can be appropriately shipped in the case where the remaining amount of the color material in the single-purpose CTG 140 is less than the threshold, regardless of whether the single-purpose CTG 140 is mounted on the printer 100 or the general-purpose CTG 130 is mounted thereon.

Here, a first comparative example can be conceived in which in T124 of FIG. 5, the printer 100 sends the SP server 10 printer information that includes remaining amount information indicating a remaining amount "70%" of the general-purpose CTG 130 currently mounted on the printer 100. In the first comparative example, the SP server 10 determines that the remaining amount "70%" is equal to or greater than the threshold and thus does not send the shipping request to the shipping server 50. As a result, a new single-purpose CTG is not shipped despite the remaining amount of the color material in the single-purpose CTG 140 at user's hand being 0%.

Further, a second comparative example can be conceived in which in the case where the printer information includes the type information "general-purpose", the SP server 10 does not execute the process of determining whether a new single-purpose CTG 140 is to be shipped or not (see T90 in FIG. 4, T132 in FIG. 5). In the second comparative example as well, as with the first comparative example, a new single-purpose CTG may not be shipped despite the remaining amount of the color material in the single-purpose CTG 140 at user's hand being 0% (or less than the threshold).

To the contrary, in the present embodiment, the printer 100 sends the SP server 10 remaining amount information indicating the remaining amount of the color material in the single-purpose CTG 140 regardless of whether the single-purpose CTG 140 is mounted on the printer 100 or the general-purpose CTG 130 is mounted thereon. A new single-purpose CTG can thus be appropriately shipped in the case where the remaining amount of the color material in the single-purpose CTG 140 is less than the threshold, regardless of whether the single-purpose CTG 140 is mounted on the printer 100 or the general-purpose CTG 130 is mounted thereon. Thus, in the present embodiment, a new single-purpose CTG can be appropriately shipped.

CORRESPONDENCE RELATIONSHIPS

The printer 100 is an example of "printer". The combination of the SP server 10 and the shipping server 50 is an example of "server". The printing service is an example of "service". The general-purpose CTG 130 and the single-purpose CTG 140 are examples of "general-purpose color material cartridge" and "single-purpose color material cartridge", respectively. The remaining amount information stored in the single-purpose remaining amount region of the state table 164 is an example of "remaining amount-related information". The type information "single purpose" and the type information "general purpose" are examples of "single-purpose information" and "general-purpose information", respectively. The printer information sent in T84 of FIG. 4 and the printer information sent in T124 of FIG. 5 are examples of "first printer information" and "second printer information", respectively. The e-mail EM is an example of "first notification information (and second notification information)". The remaining amount included in printer information being less than a threshold (e.g., less than 20%) is an example of satisfying "predetermined condition". "20%" is an example of "threshold". T140 and T142 of FIG. 5 are an example of "shipping process".

T84 in FIGS. 4 and T124 in FIG. 5 are examples of "send first printer information" and "send second printer information" by the "printer", respectively. T90 in FIGS. 4 and T132 in FIG. 5 are examples of "determine whether the remaining amount-related information included in the received first printer information or the received second printer information satisfies a predetermined condition" by the "server". T140 and T142 in FIG. 5 are an example of "execute a shipping process" by the "server". T76 in FIGS. 3 and T126 in FIG. 5 are examples of "notify first notification information (and notify second notification information)" by the "server". T90 in FIGS. 4 and T132 in FIG. 5 are examples of "determining whether the remaining amount-related information included in the received first printer information or the received second printer information satisfies a predetermined condition". T140 and T142 in FIG. 5 is an example of "executing a shipping process".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The state table 164 may store a used amount indicating a total amount of used color material in the color material CTG, instead of the remaining amount. In this case, the remaining amount of color material in the color material CTG is a value calculated by subtracting the used amount from 100. In the present modification, the used amount is an example of the "remaining amount-related information".

(Modification 2) The service table 162 may not store the CTG type. In this case, the printer 100 may send the SP server 10 printer information that includes a CTG model number instead of the type information. In the case where the CTG model number includes the character string "sc", the SP server 10 may determine that the color material CTG currently mounted on the printer 100 is the single-purpose CTG 140, whereas in the case where the CTG model number includes the character string "nc", the SP server 10 may determine that the color material CTG currently mounted on the printer 100 is the general-purpose CTG 130. In the present modification, the CTG model number including the character string "sc" and the CTG model number including the character string "nc" are examples of the "single-purpose information" and the "general-purpose information", respectively.

(Modification 3) When receiving printer information from the printer 100, the SP server 10 may determine whether a difference between the remaining amount information included in the immediately previous printer information and the remaining amount information included in the latest printer information is no less than a predetermined value (e.g., 50%). Then, the SP server 10 may send the shipping request to the shipping server 50 (see T140 in FIG. 5) in a case where the difference is equal to or greater than the predetermined value. In the present modification, the difference being equal to or greater than the predetermined value is an example of satisfying the "predetermined condition". In the present modification, a new single-purpose CTG can be appropriately shipped to the user of the printer 100 in a case where the remaining amount of the color material in the single-purpose CTG 140 relatively rapidly decreases due to printing on a large quantity of print medium in a short amount of time using the color material in the single-purpose CTG 140. In another modification, the SP server 10 may predict a time period by which the remaining amount of the single-purpose CTG becomes 0% based on the remaining amount information included in printer information received from the printer 100 in the past and the remaining amount information included in the latest printer information received from the printer 100. Here, the "printer information received from the printer 100 in the past" means, for example, printer information received from the printer 100 for the first time since a new single-purpose CTG was mounted to the printer 100. The SP server 10 may send the shipping request to the shipping server 50 in a case where the predicted time period is less than a predetermined threshold (e.g., 20 days). In the present modification, the predicted time period being less than the predetermined threshold is an example of satisfying the "predetermined condition". In another modification, the SP server 10 may send the shipping request to the shipping server 50 in a case where at least one of: the remaining amount information included in printer information being less than the threshold; the difference above being equal to or greater than the predetermined value; and the time period above being less than the predetermined threshold is satisfied. In the present modification, satisfying at least one of the remaining amount information included in printer information being less than the threshold; the difference above being equal to or greater than the predetermined value; and the time period above being less than the predetermined threshold is an example of satisfying the "predetermined condition".

(Modification 4) The SP server 10 may send notification screen data to the printer 100, instead of T76 in FIG. 3. In response to receiving the notification screen data from the SP server 10, the printer 100 may display a notification screen represented by the notification screen data. The notification screen may include two messages (i.e., the two messages in the e-mail EM displayed in T78 of FIG. 3). In the present modification, the notification screen is an example of the "first notification information (and second notification information)". Sending the notification screen data to the printer 100 is an example of "notify first notification information (and notify second notification information)" by the "server".

(Modification 5) The e-mail EM sent in T76 of FIG. 3 may include only one of the two messages (i.e., the two messages in the e-mail EM displayed in T78 of FIG. 3). In the present modification, one of "notify first notification information" and "notify second notification information" by the "server" can be omitted. In another modification, the SP server 10 may not send the e-mail EM even though it receives printer information including the type information "general purpose". That is, in the present modification, T76 and T78 in FIGS. 3 and T126 and T128 in FIG. 5 can be omitted. In the present modification, both of "notify first notification information" and "notify second notification information" by the "server" can be omitted.

(Modification 6) In the embodiment above, the SP server 10 and the shipping server 50 cooperate to execute the process for shipping a single-purpose CTG to the user of the printer 100. In a modification, the SP server 10 alone may execute the process for shipping a single-purpose CTG to the user of the printer 100. In the present modification, the SP server 10 is an example of the "server". In another modification, the SP server 10 may comprise a plurality of servers. For example, the SP server 10 may comprise a first server and a second server. In the present modification, the first server may receive printer information from the printer 100 (T56 in FIG. 2, T74 in FIG. 3, T84 in FIG. 4, T124 in FIG. 5). The second server may execute various processes using the printer information received by the first server (T76 in FIGS. 3, T86 to T90 in FIGS. 4, T126, T130 to T140 in FIG. 5).

(Modification 7) In the embodiment above, the number of sheets in the state table 164 represents the cumulative number of print medium on which printing was executed using the color material in a single-purpose CTG. In a modification, the number of sheets in the state table 164 may represent the number of print medium on which printing was executed using the color material in a single-purpose CTG within a predetermined time period. In this case, the printer 100 may send the SP server 10 printer information that includes information representing the number of print medium within the predetermined time period, instead of the cumulative number information. The SP server 10 may store the information included in the printer information as the predetermined period sheets number in the device table 34. In the present modification, the device table 34 may not store the cumulative number of sheets.

(Modification 8) in the embodiment above, when receiving printer information including the type information "single purpose" for the first time from the printer 100, the SP server 10 determines that the single-purpose CTG 140 has been mounted to the printer 100 for the first time and starts counting for the predetermined period sheets number (see T86, T88 in FIG. 4). In a modification, when receiving printer information that includes nonblank remaining amount information and cumulative number information for the first time from the printer 100, the SP server 10 may determine that the single-purpose CTG 140 has been mounted to the printer 100 for the first time.

(Modification 9) In the embodiment above, the processes of FIGS. 2 to 5 are implemented by software (e.g., the program 30), however, at least one of those processes may be implemented by hardware such as a logic circuit.

What is claimed is:

1. A printer system comprising a printer and a server, wherein
   the printer is configured to use both a single-purpose color material cartridge for receiving provision of a service related to printing and a general-purpose color material cartridge different from the single-purpose color material cartridge,
   the printer comprises:
      a memory configured to store remaining amount-related information related to a remaining amount of color material in the single-purpose color material cartridge mounted on the printer; and
      a printer controller,
   the printer controller is configured to:
      in a case where the single-purpose color material cartridge is mounted on the printer, send first printer information to the server, wherein the first printer information includes single-purpose information which indicates the single-purpose color material cartridge is mounted on the printer and the remaining amount-related information which has been stored in the memory; and
      in a case where the general-purpose color material cartridge is mounted on the printer, send second printer information to the server, wherein the second printer information includes general-purpose information which indicates the general-purpose color material cartridge is mounted on the printer and the remaining amount-related information which has been stored in the memory, the server comprises a server controller, and the server controller is configured to:

regardless of which of the first printer information including the single-purpose information and the second printer information including the general-purpose information has been received from the printer, determine whether the remaining amount-related information included in the received first printer information or the received second printer information satisfies a predetermined condition; and     in a case where the predetermined condition is satisfied, execute a shipping process for shipping a new single-purpose color material cartridge.

2. The printer system as in claim 1, wherein in a case where the remaining amount obtained by using the remaining amount-related information is less than a threshold, the predetermined condition is satisfied.

3. The printer system as in claim 1, wherein the printer is configured to operate selectively in one of a plurality of states including a service enabled state in which the printer is capable of receiving provision of the service and a service disabled state in which the printer is incapable of receiving provision of the service, in a case where the printer operates in the service enabled state and the single-purpose color material cartridge is mounted on the printer, the printer controller is configured to send the first printer information, in a case where the printer operates in the service enabled state and the general-purpose color material cartridge is mounted on the printer, the printer controller is configured to send the second printer information, in a case where the printer operates in the service disabled state, neither the first printer information nor the second printer information is sent to the server, and the server controller is further configured to:

in a case where the second printer information is received from the printer, notify first notification information to a user of the printer, wherein the first notification information is information to notify that the general-purpose color material cartridge is mounted on the printer in spite of the printer operating in the service enabled state.

4. The printer system as in claim 1, wherein the server controller is further configured to:

in a case where the second printer information is received from the printer, notify second notification information to a user of the printer, wherein the second notification information is information to notify that the single-purpose color material cartridge is to be mounted to the printer instead of the general-purpose color material cartridge.

5. A non-transitory computer-readable recording medium storing computer-readable instructions for a server configured to communicate with a printer, wherein the printer is configured to use both a single-purpose color material cartridge for receiving provision of a service related to printing and a general-purpose color material cartridge different from the single-purpose color material cartridge, the printer is configured to store remaining amount-related information related to a remaining amount of color material in the single-purpose color material cartridge mounted on the printer in a memory, in a case where the single-purpose color material cartridge is mounted on the printer, the printer is configured to send first printer information to the server, wherein the first printer information includes single-purpose information which indicates the single-purpose color material cartridge is mounted on the printer and the remaining amount-related information which has been stored in the memory, in a case where the general-purpose color material cartridge is mounted on the printer, the printer is configured to send second printer information to the server, wherein the second printer information includes general-purpose information which indicates the general-purpose color material cartridge is mounted on the printer and the remaining amount-related information which has been stored in the memory, and the computer-readable instructions, when executed by a processor of the server, cause the server to:

regardless of which of the first printer information including the single-purpose information and the second printer information including the general-purpose information has been received from the printer, determine whether the remaining amount-related information included in the received first printer information or the received second printer information satisfies a predetermined condition; and     in a case where the predetermined condition is satisfied, execute a shipping process for shipping a new single-purpose color material cartridge.

6. The non-transitory computer-readable recording medium as in claim 5, wherein in a case where the remaining amount obtained by using the remaining amount-related information is less than a threshold, the predetermined condition is satisfied.

7. The non-transitory computer-readable recording medium as in claim 5, wherein the printer is configured to operate selectively in one of a plurality of states including a service enabled state in which the printer is capable of receiving provision of the service and a service disabled state in which the printer is incapable of receiving provision of the service, in a case where the printer operates in the service enabled state and the single-purpose color material cartridge is mounted on the printer, the first printer information is sent to the server, in a case where the printer operates in the service enabled state and the general-purpose color material cartridge is mounted on the printer, the second printer information is sent to the server, in a case where the printer operates in the service disabled state, neither the first printer information nor the second printer information is sent to the server, and the computer-readable instructions, when executed by the processor, further cause the server to:

in a case where the second printer information is received from the printer, notify first notification information to a user of the printer, wherein the first notification information is information to notify that the general-purpose color material cartridge is mounted on the printer in spite of the printer operating in the service enabled state.

8. The non-transitory computer-readable recording medium as in claim 5, wherein the computer-readable instructions, when executed by the processor, further cause the server to:

in a case where the second printer information is received from the printer, notify second notification information to a user of the printer, wherein the second notification information is information to notify that the single-purpose color material cartridge is to be mounted to the printer instead of the general-purpose color material cartridge.

9. A server comprising the non-transitory computer-readable recording medium storing computer-readable instructions for the server as in claim 5.

10. A method executed by a server configured to communicate with a printer, wherein the printer is configured to use both a single-purpose color material cartridge for receiving provision of a service related to printing and a general-purpose color material cartridge different from the single-purpose color material cartridge, the printer is configured to store remaining amount-related information related to a remaining amount of color material in the single-purpose color material cartridge mounted on the printer in a memory, in a case where the single-purpose color material cartridge is mounted on the printer, the printer is configured to send first printer information to the server, wherein the first printer information includes single-purpose information which indicates the single-purpose color material cartridge is mounted on the printer and the remaining amount-related information which has been stored in the memory, in a case where the general-purpose color material cartridge is mounted on the printer, the printer is configured to send second printer information to the server, wherein the second printer information includes general-purpose information which indicates the general-purpose color material cartridge is mounted on the printer and the remaining amount-related information which has been stored in the memory, and the method comprises:

regardless of which of the first printer information including the single-purpose information and the second printer information including the general-purpose information has been received from the printer, determining whether the remaining amount-related information included in the received first printer information or the received second printer information satisfies a predetermined condition; and in a case where the predetermined condition is satisfied, executing a shipping process for shipping a new single-purpose color material cartridge.

* * * * *